(12) United States Patent
Defilla et al.

(10) Patent No.: US 7,293,740 B2
(45) Date of Patent: Nov. 13, 2007

(54) AIRCRAFT CREWMEMBER ARTICULATING BERTH SYSTEM

(75) Inventors: Riccardo Defilla, Florence (IT); Luigi Crocco, Gallarate (IT); Simone Messeri, Florence (IT)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 10/710,651

(22) Filed: Jul. 27, 2004

(65) Prior Publication Data

US 2006/0022087 A1 Feb. 2, 2006

(51) Int. Cl.
*B64D 11/06* (2006.01)
*A47C 27/10* (2006.01)

(52) U.S. Cl. .............. 244/118.6; 244/122 R; 5/710; 5/118; 5/615

(58) Field of Classification Search ............ 5/710, 5/713, 118, 615, 618
See application file for complete search history.

(56) References Cited

U.S. PATENT DOCUMENTS

| | | | | |
|---|---|---|---|---|
| 3,667,075 A | * | 6/1972 | Ballard et al. ............ 5/22 |
| 4,078,842 A | * | 3/1978 | Zur .......................... 297/229 |
| 5,884,968 A | * | 3/1999 | Massara .................. 297/216.12 |
| 6,056,239 A | * | 5/2000 | Cantu et al. ............. 244/118.6 |
| 6,119,980 A | * | 9/2000 | Ferry ....................... 244/122 R |
| 6,155,519 A | * | 12/2000 | Rajasingham ............. 244/118.6 |
| 6,173,921 B1 | * | 1/2001 | Neumann et al. ......... 244/118.6 |
| 6,227,489 B1 | * | 5/2001 | Kitamoto et al. ......... 244/118.5 |
| 6,520,451 B1 | * | 2/2003 | Moore ...................... 244/118.5 |
| 6,616,098 B2 | * | 9/2003 | Mills ....................... 244/118.5 |
| 6,681,425 B2 | * | 1/2004 | Leventhal et al. ............. 5/660 |
| 6,698,827 B2 | * | 3/2004 | Le Gette et al. ........... 297/16.2 |
| 6,776,433 B2 | * | 8/2004 | Harrison et al. ............ 280/647 |
| 2004/0232283 A1 | * | 11/2004 | Ferry et al. .............. 244/118.6 |
| 2006/0022087 A1 | * | 2/2006 | Defilla et al. ............. 244/118.5 |

* cited by examiner

*Primary Examiner*—Timothy D. Collins
(74) *Attorney, Agent, or Firm*—Ostrager Chong Flaherty & Broitman P.C.

(57) ABSTRACT

A crewmember rest support system (10) includes a berth mattress (32). A support structure (34) is coupled to and supports the berth mattress (32). A pneumatic system (36) is coupled to the support structure (34). The pneumatic system (36) includes an inflatable member (100) that has one or more inflatable states. A pump (102) actuates the inflatable member (100) and articulates a portion of the support structure (34).

37 Claims, 5 Drawing Sheets

FIG. 10

AIRCRAFT CREWMEMBER ARTICULATING BERTH SYSTEM

BACKGROUND OF INVENTION

The present invention is related generally to crew rest areas of an aircraft. More particularly, the present invention is related to crew rest area berth systems and functionality, flexibility, and creature comfort and convenience thereof.

System design of modern aircraft can account for various customer requirements, which can be analyzed based on selected categories, such as safety, ergonomics, support system capability, functionality, and multi-use application capability. It is desirable within the airline industry for a system of interest to satisfy multiple categories. For example, a staircase may be designed to be both functional and ergonomic, thereby satisfying multiple categories. The satisfying of multiple categories provides system efficiency, minimizes system costs, and simplifies and provides lightweight systems.

Modern aircraft typically include crew rest areas that may have enclosures, such as berth enclosures, seating enclosures, lavatory enclosures, and stowage enclosures. A berth enclosure typically provides an area for sleeping and/or resting horizontally only.

A majority of traditional berths include separate rigid type structures, which often have simple rectangular shapes. These structures can be somewhat uncomfortable, occupy a considerable amount of space, and have minimal position adjustment and limited orientation flexibility.

Also, traditional berths tend to be creature comfort limited and have limited or restricted space for occupant movement therein, which is partially attributable from the minimal amount of space allotted for crew rest areas in an aircraft. Also, traditional crew rests have dedicated enclosures to provide seats. These enclosures increase the overall cost and weight of the crew rest.

Thus, there exists a need for an improved crew rest area that combines the functionality of both a typical seat as well as that of a berth enclosure.

SUMMARY OF INVENTION

One embodiment of the present invention provides a crewmember rest support system that includes a berth mattress. A support structure is coupled to and supports the berth mattress. A pneumatic system is coupled to the support structure. The pneumatic system includes an inflatable member that has one or more inflatable states. A pump actuates the inflatable member and articulates a portion of the support structure.

The embodiments of the present invention provide several advantages. One such advantage is the provision of a crewmember rest support system that includes a mattress that is pneumatically articulated. The stated system is a simple, inexpensive, and compact technique that may be used as a bed or seat.

Another advantage provided by an embodiment of the present invention is the provision of a crew rest compartment that includes an ergonomically designed and functioning berth and as such provides increased creature comfort and convenience and eliminates the need for a typical seat enclosure module.

Yet another advantage provided by an embodiment of the present invention is the provision of a berth with a mattress support structure having multiple joints to allow ergonomic conformance and adjustment of a mattress.

Still another advantage provided by an embodiment of the present invention is the provision of a berth having creature comfort features, such as a retractable tray, deployable armrests, and actuatable headrest in addition to a pneumatically controlled mattress.

The present invention itself, together with further objects and attendant advantages, will be best understood by reference to the following detailed description, taken in conjunction with the accompanying drawing.

DETAILED DESCRIPTION

In the following Figures the same reference numerals will be used to refer to the same components. While the present invention is described primarily with respect to crew rest area berth systems and functionality, flexibility, and creature comfort and convenience thereof, the present invention may be adapted and applied in various vehicle and non-vehicle applications. The present invention may be applied in aeronautical applications, nautical applications, railway applications, automotive vehicle applications, and commercial and residential applications, as well as in other applications where berths are utilized. The present invention may also be applied to crewmember and non-crewmember applications.

In the following description, various operating parameters and components are described for one constructed embodiment. These specific parameters and components are included as examples and are not meant to be limiting.

Figure 1:
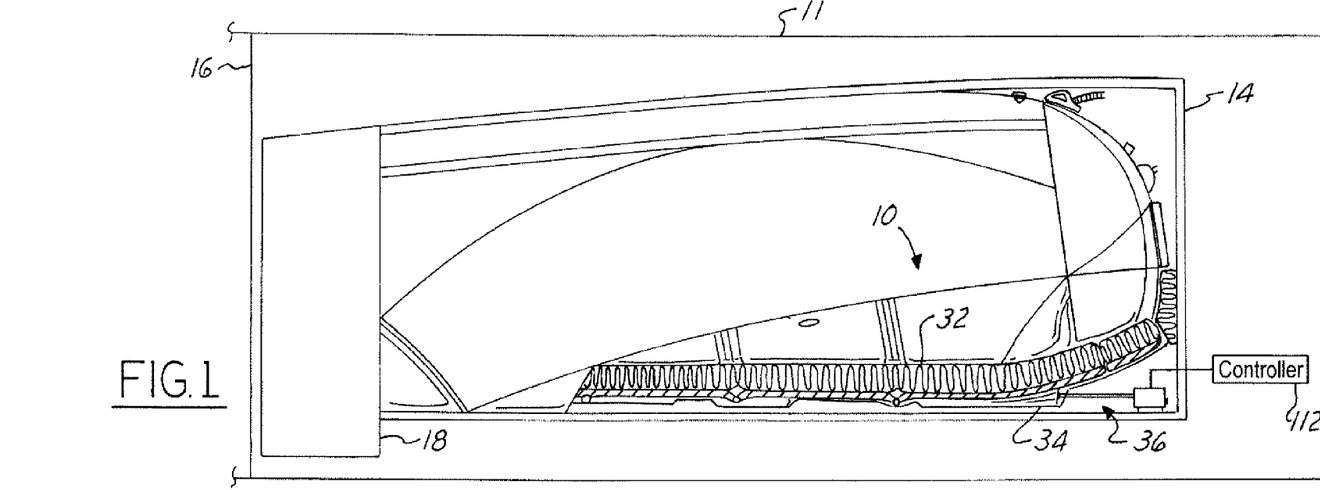
FIG. 1 is a side view of a crew rest compartment of an aircraft incorporating a crewmember rest support system with a pneumatically actuated berth mattress in accordance with an embodiment of the present invention.
Figure 2:
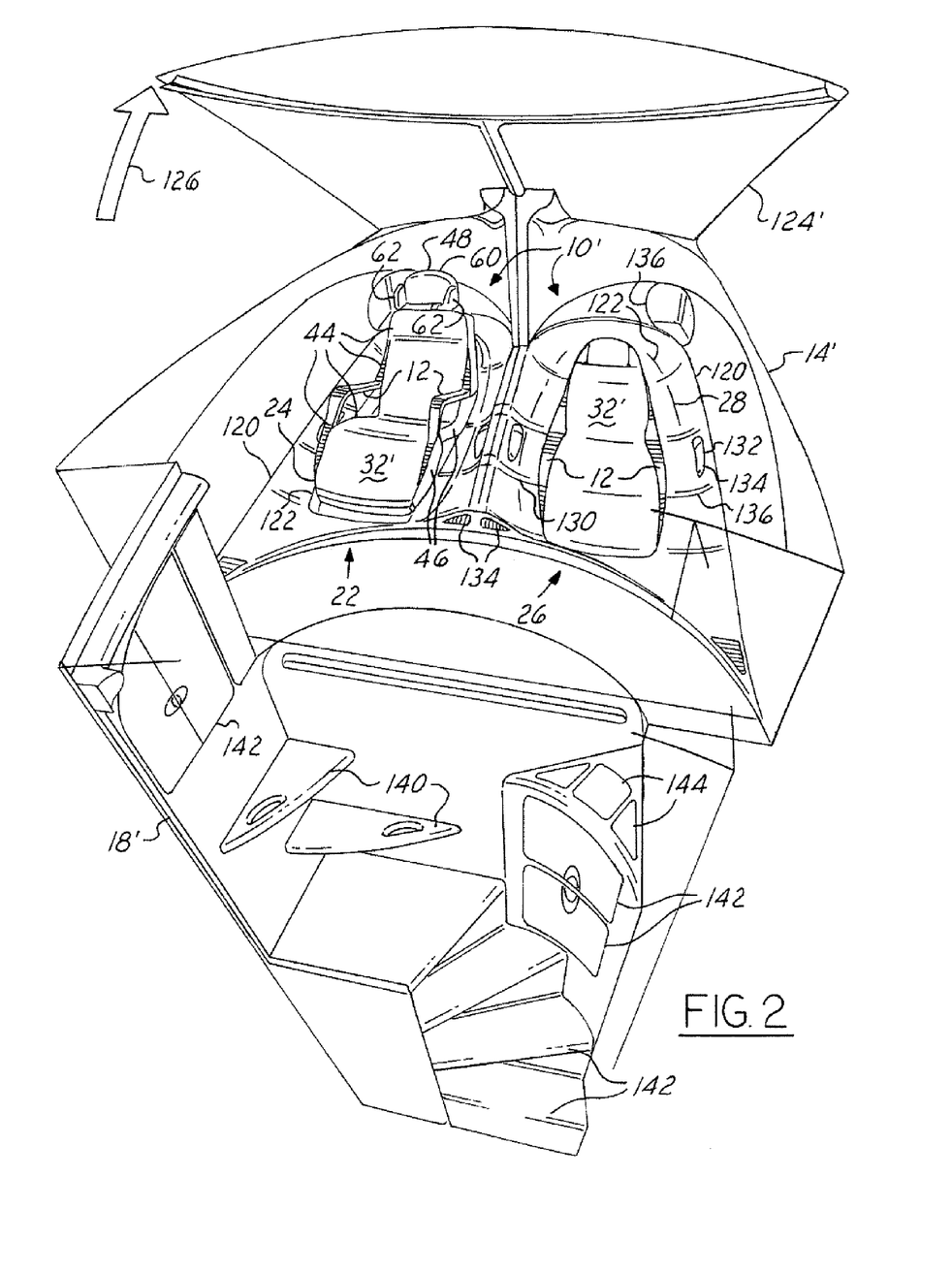
FIG. 2 is a perspective view of a berth incorporating a crewmember rest support system and associated access unit in accordance with another embodiment of the present invention.
Figure 3:
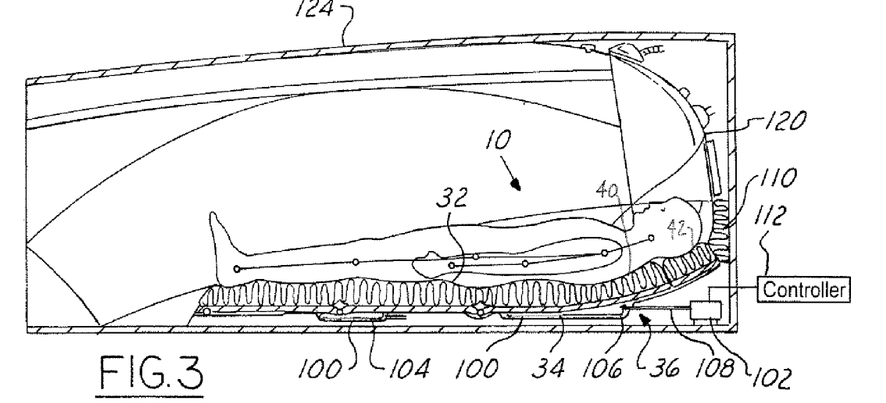
FIG. 3 is a side view of the berth of FIG. 1 with the crewmember rest support system in a undeployed orientation.
Figure 4:
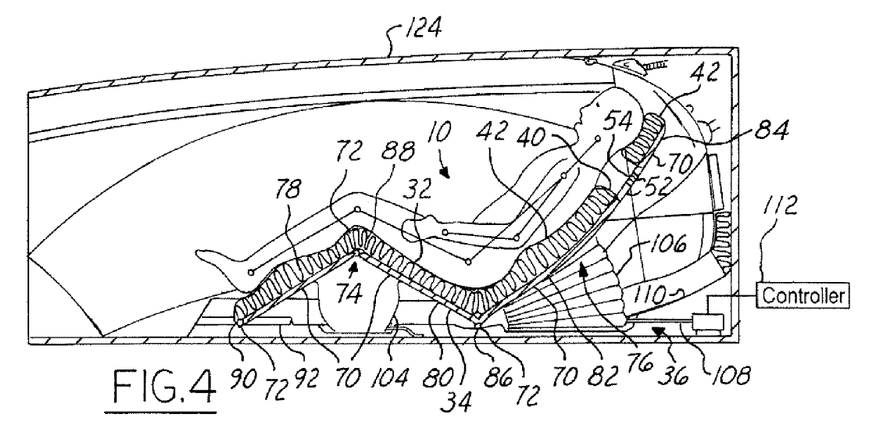
FIG. 4 is a side view of the berth of FIG. 1 with the crewmember rest support system in a deployed orientation.

Referring now to FIGS. 1-4, crewmember rest support systems 10 and 10" of an aircraft 11 are shown in accordance with multiple embodiments of the present invention. FIGS. 1, 3, and 4 illustrate the rest support system 10, whereas FIG. 2 illustrates the rest support system 10", which is similar to the rest support system 10, but includes armrests 12. In FIG. 1, the rest support system 10 is shown as part of a berth 14 within a crew rest compartment 16. In FIG. 2, the rest support system 10" is shown as part of the berth 14". In FIGS. 1 and 2, sample access units 18 and 18" are also shown for access to the berths 14 and 14". The berth 14" has a first half 22 with a first rest support system 24 and a second half 26 with a second rest support system 28. In FIG. 3, the rest support system 10 is shown in an undeployed state, whereby it may be used as a bed. In FIG. 4, the rest support system 10 is shown in a deployed state, whereby it may be used as an inclined seat. The rest support systems 10 and 10" include pneumatically actuated berth mattresses 32 and 32".

The rest support systems 10 and 10" include the berth mattresses 32 and 32", the mattress support structures 34, and one or more pneumatic systems 36. The support structures and pneumatic systems of the rest support system 10" are not shown but are similar to that of the rest support system 10. The rest support systems 10 and 10" may be adjusted to be in various orientations, three of which are shown in FIGS. 2-4. The rest support systems 10 and 10" are ergonomically shaped to be similar to the shape of a human body. In an example embodiment, the rest support systems 10 and 10" are cocoon shaped. The shape of the rest support systems 10 and 10" aids in minimizing the amount of space occupied and provides increased comfort for occupants. The berth mattresses 32 and 32" and the support structures 34 are articulated via the pneumatic system 36.

Figure 5:
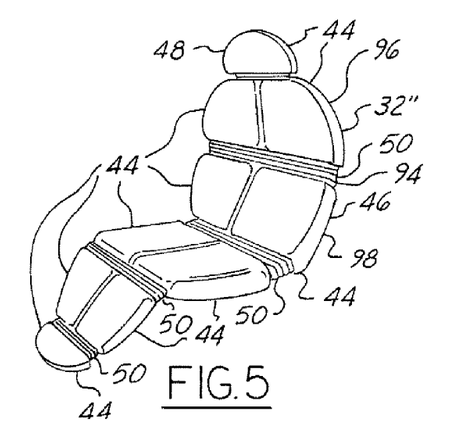
FIG. 5 is a perspective view of a berth mattress in accordance with an embodiment of the present invention.

Referring now also to FIG. 5, a perspective view of a berth mattress 32"" in accordance with an embodiment of the present invention is shown. The mattress 32"" may be used in replacement of the mattresses 32 and 32". The mattresses 32, 32", and 32"" may be of various shapes, styles, and types. The mattresses 32, 32", and 32"" are ergonomically shaped and cocooned shaped to provide occupant comfort and support. The mattresses 32, 32", and 32"" may be in the form of a pad, a cushion, a mat, a case filled with resilient material, an inflatable mat, or may be in some other form known in the art. The mattress 32 has a main segment 40 and a headrest 42. The mattresses 32" and 32"" have multiple mattress segments 44 that form a main body portion 46 and a headrest 48. The mattress segments 44 are coupled sequentially via flex-joints 50. The headrests 42 and 48 may be coupled to the mattresses 32, 32", and 32"" via headrest poles and have a flex-joint, such as headrest poles 52 and flex-joint 54 of rest support system 10, as shown in FIG. 4. The mattresses tresses 32, 32", and 32"" may have any number of mattress segments and flex-joints.

The flex-joints 50 and 54 may be in the form of springs, resilient material, flexible material, or other materials known in the art that allow for the bending, extension, and flexing thereof. The flex-joints 50 and 54 allow the mattresses 32" and 32"" to be articulated and to be conformed into various orientations.

The headrests 42 and 48 may be position adjustable and manually or systematically actuated. The headrests 42 and 48 may be manually actuated using conventional methods. The poles 52 may have notches (not shown) associated with the amount of extension of the headrests 42 and 48 from the support structures 34. The headrests 42 and 48 may be electrically or pneumatically operated and articulated, or may be operated and articulated via some other mechanism known in the art. The headrests 42 and 48 may be tilted and rotated. The headrests 42 and 48 may also be segmented, as shown by the headrest 48, which includes a center segment 60 and a pair of end segments 62. The end segments 62 may have audio speakers (not shown) contained therein.

The support structure 34 is coupled to and supports the mattress 32. The support structure is similar in shape to that of the mattress 32. The support structure 34 may be in the form of a frame, a resistive material, a weaved material, or other supportive material or device known in the art. The support structure 34 may have multiple support elements 70 with pivot joints 72 therebetween, as shown in FIGS. 1, 3, and 4. The pivot joints 72 allow the support elements 70 to pivot relative to each other. The pivot joints 72 may include sliders, rollers, bearings, or other related components for allowing smooth transition and rotation thereof.

The support structure 34 may be rigid or may be forgiving or flexible to allow further conformance of the mattress 32 to the shape of an occupant thereon. The support structure 34 as shown, includes four support elements that are located within a first portion 74 and a second portion 76 of the support structure 34, respectively. The support structure 34 includes a lower leg element 78, an upper leg element 80, a back element 82, and a headrest element 84. A fixed pivot joint 86 is coupled between the upper leg element 80 and the back element 82. A knee pivot joint 88 is coupled between the lower leg element 78 and the upper leg element 80. A slider pivot joint 90 is coupled to the lower leg element 78. The fixed pivot joint 86 is fixed in vertical and horizontal position. The slider pivot joint 90 resides within a channel 92 and may slide in a horizontal direction to allow the knee pivot joint 88 to be raised and lowered as desired.

Although a specific amount of support elements and pivot joints are shown any number may be utilized. For example, another pivot joint may reside in the middle of the back element 82 to correspond with the flex joint 94 between the upper back portion 96 and the lower back portion 98 of the mattress 32"". The pivot joints 72 may include joints associated with various parts of a human anatomy, such as an ankle joint, a leg joint, a pelvic joint, a back joint, and a neck joint.

The pneumatic system 36 includes one or more inflatable members 100 and one or more pumps 102. The rest support system 10 includes a first inflatable member 104 that resides under the knee pivot joint 88 and is coupled to the lower leg element 78 and the upper leg element 80. A second inflatable member 106 resides under and is coupled to the back element 82. The inflatable members 104 and 106 are inflated or expanded and retracted via a pump 102. The inflatable members 104 and 106 are coupled to the pump 102 via air lines 108. The pump 102 may be coupled to an air supply unit (not shown). The air supply unit may be located within the berth 14 or located elsewhere in the aircraft and be of various styles and types.

The inflatable members 100 are in the form of air bags. The first member 104 is in the form of a spherical air bag and the second member 106 is in the form of a pleated air bag. The first member 104 resides between the leg elements 78 and 80 and the base 110 and when expanded raises the knee joint 88, thereby tilting the lower element 78 and the upper element 80. The second member 106 resides between the back element 82 and the base 110 and is configured to tilt the back element 82 when expanded. The second member 106 may be configured to tilt portions of the back element 82 at different angles. For example, the back portions 96 and 98 of mattress 32"" are shown in FIG. 5 as being tilted at different angles relative to a common reference. The inflatable members 104 and 106 may be of various sizes, shapes, and styles, may be formed of various materials, and may have any number of inflated orientations to provide any number of positions of the elements 78, 80, and 82.

Any number of inflatable members may be utilized. As an example, another inflatable member (not shown) may be utilized to extend and retract the headrests 42 and 48. The inflatable member may reside between the back portions 82, 96, and 98 and the headrests 42 and 48 and be coupled to a pump, similar to the inflatable members 104 and 106.

The pump 102 may be coupled to a controller 112, as shown in FIGS. 1, 3, and 4, which is used to control orientation of the support structure 34. The controller 112 may be microprocessor based such as a computer having a central processing unit, have memory (RAM and/or ROM), and have associated input and output buses. The controller 112 may be in the form of an application-specific integrated circuit or may be formed of other logic devices known in the art. The controller 112 may be a portion of a central vehicle controller or may be a stand-alone controller as shown.

The berths 14 and 14" may include the enclosures 120 and various creature comfort and convenience features, which are stated below. The enclosures 120 may also be cocoon shaped. The enclosures 120 includes the base units 110 and 122, which may be of various sizes and shapes and are used to hold the mattresses 32 and 32" and support structures 34. The berths 14 and 14" may have ceilings, such as ceilings 124 and 124", which may be raised or lowered, as is depicted by the arrow 126.

Figures 8, 9B:
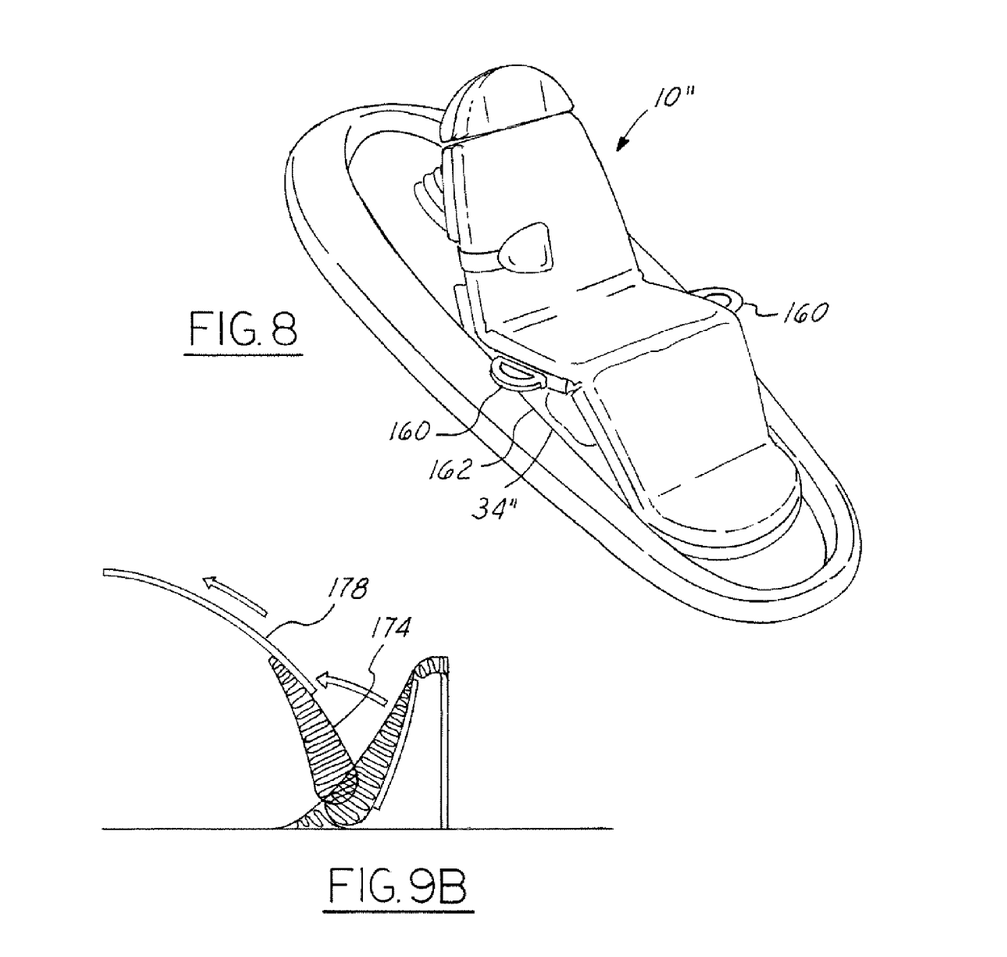
FIG. 8 is a perspective view of a crewmember rest support system incorporating cup holders in accordance with another embodiment of the present invention.
FIG. 9B is a side cross-sectional of a deployable tray portion of the retractable tray system of FIG. 9A.
Figure 10:
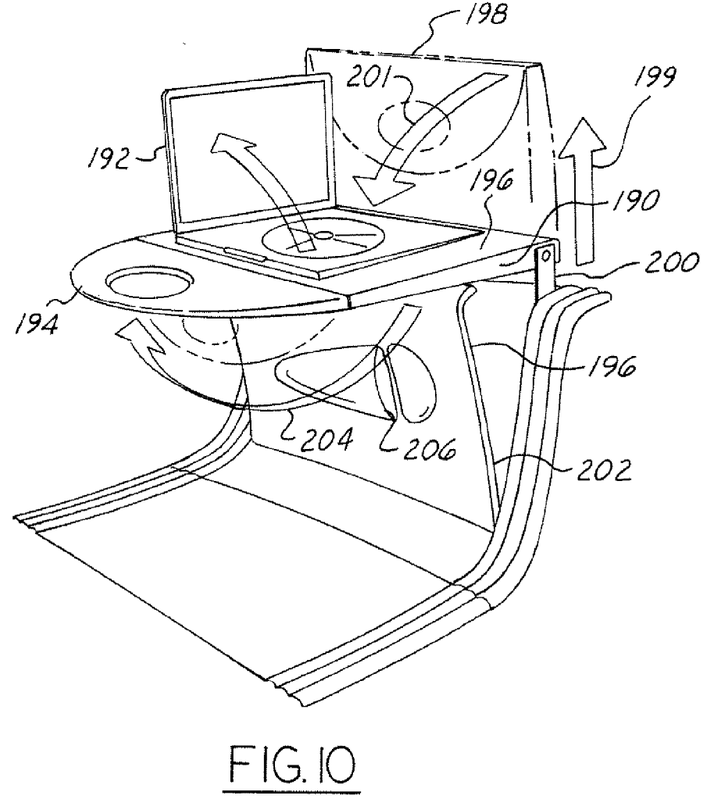
FIG. 10 is a perspective view of a retractable folding tray incorporating a personal electronic device and a cup holder in accordance with another embodiment of the present invention.

The creature and comfort features may include, in addition to the crewmember rest support systems 10 and 10" including the armrests 12, the mattresses 32 and 32", pneumatic systems 36, and the headrests 42 and 48 described above, a retractable tray unit 130, pneumatic systems controls 132, audio and video devices (not shown), curtains (not shown), air conditioning devices and controls 134, restraints (not shown), personal electronic devices (a sample of which is shown in FIG. 10), cup holders (samples of which are shown in FIGS. 8 and 10), stowage units 136, and other creature comfort and convenience features known in the art.

The berths 14 and 14" may be accessed via an access unit, such as the access units 18 and 18". The access units 18 and 18" may have ergonomically designed steps 140, stowage units 142, sinks 144, as well as other creature comfort and convenience features known in the art.

Figure 6:
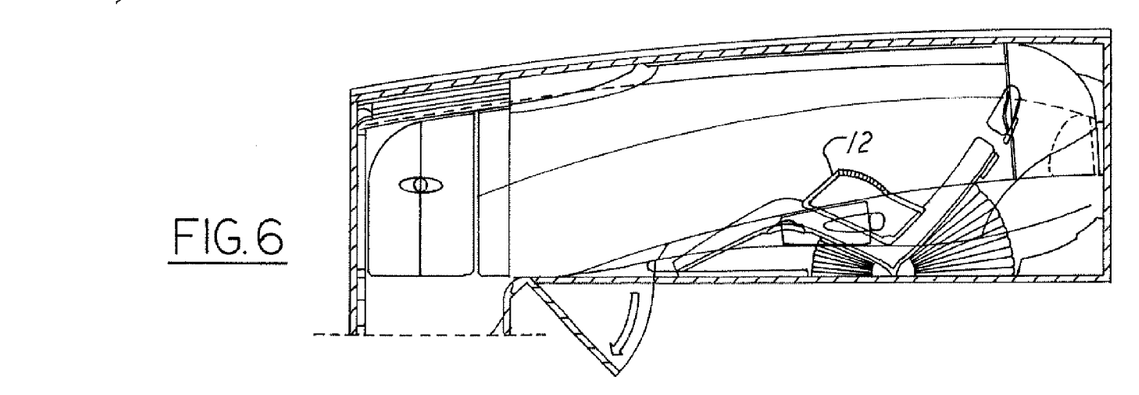
FIG. 6 is a side view of the crewmember rest support system of FIG. 2.
Figure 7A:
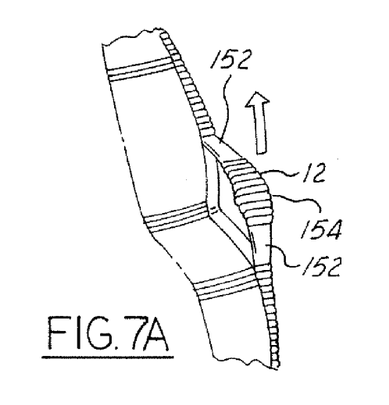
FIG. 7A is a perspective view of a deployable armrest in accordance with an embodiment of the present invention.
Figure 7B:
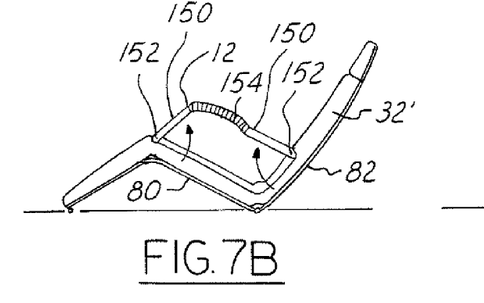
FIG. 7B is a side view of the deployable armrest of FIG. 7A in a deployed state.
Figure 7C:
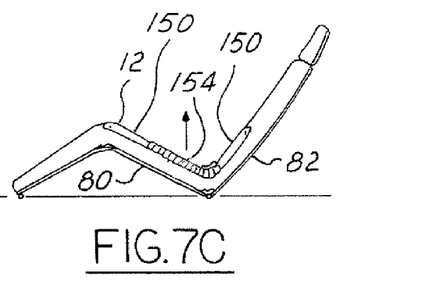
FIG. 7C is a side view of the deployable armrest of FIG. 7A in an undeployed state.

Referring now to FIGS. 6-7C, a side view of the rest support system 10" and perspective and side views of the deployable armrest 12 are shown in accordance with an embodiment of the present invention. The armrests 12 are shown in a deployed state in FIGS. 6-7B and in a stowed or undeployed state in FIG. 7C. As stated above, the rest support systems 10 and 10" may include armrests. The armrests 12 may be manually deployed or may be deployed with the tilting of the upper leg element 80 relative to the back element 82. The armrests 12 may be deployed or stowed when the mattress 32" is in the undeployed state, as shown by FIGS. 7B and 7C. The armrests 12 include a pair of rigid members 150 coupled to the mattress 32" via pivot joints 152. The rigid members 150 are coupled to each other via a flexible segment 154. The flexible segment 154 may be formed of various materials. In one embodiment of the present invention, the flexible member 154 is formed of a flexible position sustainable structure that may be adjusted into various shapes, but yet resistive to maintain shape and support an occupant arm.

Referring now to FIG. 8, a perspective view of a crewmember rest support system 10"" incorporating cup holders 160 in accordance with another embodiment of the present invention is shown. The cup holders 160 are coupled to and extend from the sides 162 of the support structure 34"". The cup holders 160 may be of various sizes, shapes, and styles. The cup holders 160 may rotate out from, flip out from, or directly extend from the support structure 34"".

Figure 9A:
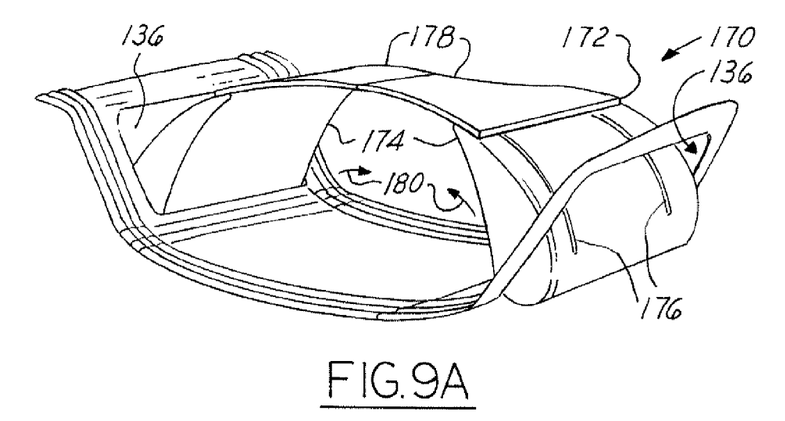
FIG. 9A is a perspective view of a retractable tray system illustrated a deployed state in accordance with an embodiment of the present invention.

Referring now to FIGS. 2, 9A, and 9B; in FIGS. 9A and 9B a perspective view of a retractable tray system 170 and a side cross-sectional view of a deployable tray portion 172 of the retractable tray system 170 in accordance with an embodiment of the present invention are shown. The retractable tray system 170 includes a pair of eye shaped swivel doors 174 with tracks 176 and a pair of tray members 178. The tray members 178 are coupled to and slide over the swivel doors 174 on the tracks 176. In use, the swivel doors 174 are rotated inward, as depicted by the arrows 180, and the tray members 178 are slid over the doors 174 until they abut each other. The tray members 178 are stowed within stowage units 136.

Referring now to FIG. 10, a perspective view of a retractable folding tray 190 incorporating a personal electronic device 192 and a cup holder 194 in accordance with another embodiment of the present invention is shown. The retractable tray 190 includes a main table portion 196 for support of the electronic device 192 and the cup holder or cup holder portion 194. In use, the tray 190 is released from a stowage compartment 196 and extended vertically to a fully extended position, shown by dashed lines 198 and arrow 199. The main portion 196 is rotated inward on hinges 200 (only one is shown), designated by arrow 201, and the tray 190 is retracted to set the main portion 196 on the door 202. The cup holder portion 194 may be extended through rotation thereof, designated by arrow 204, before setting the main portion 196 on the door 202. The door 202 has a recessed door handle 206 for easy access of the tray 190.

The present invention provides a crewmember compartment with a berth enclosure having crewmember rest support systems. The berth enclosure serves multiple functions. The rest support systems are compact and ergonomically designed. The rest support systems provide pneumatic articulation of a berth mattress for increased position adjustment and comfort. The berth enclosures also include several creature comfort and convenience features that provide additional functionality and improved occupant satisfaction.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A crewmember rest support system comprising:
    a berth mattress comprising a plurality of mattress segments;
    a support structure having a plurality of joints coupled to and supporting said berth mattress, said berth mattress being articulated at the joints provided in the support structure; and
    a pneumatic system coupled to said support structure comprising:
    at least one inflatable member having at least one inflatable state, wherein said at least one inflatable member articulates said support structure into a plurality of orientations; and at least one pump actuating said at least one inflatable member and articulating at least a portion of both of said support structure and said berth mattress, whereby said articulation takes place at the joints.

2. A rest support system as in claim 1 wherein said berth mattress is selected from at least one of a pad, a cushion, a mat, a case filled with resilient material, and an inflatable mat.

3. A rest support system as in claim 1 wherein said berth mattress is cocoon shaped.

4. A rest support system as in claim 1 wherein said berth mattress is ergonomically shaped.

5. A rest support system as in claim 1 wherein said berth mattress comprises a headrest.

6. A rest support system as in claim 5 wherein said headrest is adjustable.

7. A rest support system as in claim 5 wherein said headrest is pneumatically adjustable.

8. A rest support system as in claim 1 wherein said support structure comprises a frame.

9. A rest support system as in claim 1 wherein said support structure comprises a weaved material.

10. A rest support system as in claim 1 wherein said at least one inflatable member comprises an air bag.

11. A rest support system as in claim 10 wherein said air bag is pleated.

12. A rest support system as in claim 1 wherein said at least one inflatable member comprises: a first inflatable member expandable to adjust a first portion of said support structure; and a second inflatable member expandable to adjust a second portion of said support structure.

13. A rest support system as in claim 12 wherein said first portion comprises a leg element.

14. A rest support system as in claim 12 wherein said second portion comprises a back element.

15. A rest support system as in claim 12 wherein said second inflatable member articulates a plurality of joints of said support structure.

16. A rest support system as in claim 1 wherein said at least one pump articulates a plurality of joints in said support structure.

17. A rest support system as in claim 1 further comprising at least one armrest coupled to said berth mattress.

18. A rest support system as in claim 17 wherein said at least one armrest is deployable with articulation of said support structure.

19. A rest support system as in claim 17 wherein said at least one armrest is formed of a flexible position sustainable structure.

20. A rest support system as in claim 1 further comprising a cup holder coupled to said support structure.

21. A rest support system as in claim 1 wherein said support structure comprises: at least one fixed joint; and at least one slider joint.

22. A berth for an aircraft comprising:
a berth enclosure;
at least one berth mattress comprising a plurality of mattress segments;
at least one support structure having a plurality of joints coupled to and supporting said at least one berth mattress within said berth enclosure, said berth mattress being articulated at the joints provided in said at least one support structure; and
at least one pneumatic system coupled to said at least one support structure comprising:

at least one inflatable member having at least one inflatable state, wherein said at least one inflatable member articulates said support structure into a plurality of orientations; and
at least one pump actuating said at least one inflatable member and articulating at least a portion of both of said support structure and said berth mattress, whereby said articulation takes place at the joints.

23. A berth as in claim 22 further comprising a retractable tray coupled to and deployable within said berth enclosure.

24. A berth as in claim 22 further comprising a controller coupled to said at least one pump and controlling orientation of said at least one support structure.

25. A berth as in claim 22 further comprising a control panel coupled to and within said berth enclosure and controlling orientation of said at least one support structure.

26. A berth as in claim 22 further comprising at least one stowage unit coupled to and within said berth enclosure.

27. A berth as in claim 22 wherein said berth enclosure is divided into a first half and a second half.

28. A berth as in claim 27 wherein said first half comprises: a first berth mattress; a first support structure coupled to and supporting said first berth mattress; and a first pneumatic system coupled to and articulating said first structure.

29. A berth as in claim 28 wherein said second half comprises: a second berth mattress; a second support structure coupled to and supporting said first berth mattress; and a second pneumatic system coupled to and articulating said first structure.

30. A crew rest compartment for an aircraft comprising:
at least one berth enclosure comprising;
at least one berth mattress comprising a plurality of mattress segments;
at least one support structure having a plurality of joints coupled to and supporting said at least one berth mattress within said berth enclosure, said berth mattress being articulated at the joints provided in the at least one support structure; and
at least one pneumatic system coupled to said at least one support structure comprising:
at least one inflatable member having at least one inflatable state, wherein said at least one inflatable member articulates said support structure into a plurality of orientations; and
at least one pump actuating said at least one inflatable member and articulating at least a portion of both of said support structure and said berth mattress, whereby the articulation takes place at the joints.

31. A rest crew compartment as in claim 30 further comprising at least one access unit for accessing said at least one berth enclosure.

32. A rest crew compartment as in claim 30 wherein said at least one berth enclosure comprises:
a first ergonomically shaped berth enclosure; and
a second ergonomically shaped berth enclosure.

33. An aircraft comprising:
at least one crew rest compartment comprising;
at least one berth mattress comprising a plurality of mattress segments;
at least one support structure having a plurality of joints coupled to and supporting said at least one berth mattress within said berth enclosure, said berth mattress being articulated at the joints provided in the at least one support structure; and
at least one pneumatic system coupled to said at least one support structure comprising:

at least one inflatable member having at least one inflatable state, wherein said at least one inflatable member articulates said support structure into a plurality of orientations; and at least one pump actuating said at least one inflatable member and articulating at least a portion of both of said support structure and said berth mattress, whereby the articulation takes place at the joints.

34. An aircraft as in claim 33 further comprising a controller coupled to said at least one pump and controlling orientation of said at least one support structure.

35. A crewmember rest support system comprising: a berth mattress comprising a plurality of mattress segments; a support structure coupled to and supporting said berth mattress and having a plurality of joints, said berth mattress being articulated at the joints provided in the support structure; and a pneumatic system coupled to and articulating said support structure into a plurality of orientations so that the articulation takes place at the joints, said pneumatic system comprising: a first inflatable member articulating a first portion of said support structure; and a second inflatable member articulating a second portion of said support structure.

36. A method for providing in an aircraft, a crew rest area which comprises providing a crew rest support system that includes a berth mattress comprising a plurality of mattress segments, coupling and supporting said berth mattress with a support structure having a plurality of joints, said berth mattress being articulated at the joints provided in said support structure, coupling a pneumatic system to said support structure, wherein said pneumatic system includes at least one inflatable member, activating said inflatable member and articulating at least a portion of said support structure so that the articulation takes place at the joints.

37. A method according to claim 36, wherein said mattress has multiple joints for allowing the mattress to be articulated and to be conformed with various orientations.

* * * * *